United States Patent [19]

Morgan, Jr.

[11] Patent Number: 5,527,463
[45] Date of Patent: Jun. 18, 1996

[54] LIQUID FILTERING DEVICE INCLUDING A VESSEL AND CARTRIDGE HAVING COOPERATING SUPPORT

[76] Inventor: H. William Morgan, Jr., P.O. Box 735, Michigan City, Ind. 46361

[21] Appl. No.: 404,193

[22] Filed: Mar. 13, 1995

[51] Int. Cl.[6] .......................... B01D 27/08; B01D 35/30
[52] U.S. Cl. ........................................ 210/450; 210/451
[58] Field of Search .................... 210/441, 442, 210/453, 455, 450, 451, 497.01

[56] References Cited

U.S. PATENT DOCUMENTS

| | | | |
|---|---|---|---|
| 2,507,125 | 5/1950 | Townsend | 210/441 |
| 4,257,890 | 3/1981 | Hurner | 210/442 |
| 4,507,203 | 3/1985 | Johnston | 210/453 |
| 5,100,541 | 3/1992 | Kallenbach | 210/450 |
| 5,128,037 | 7/1992 | Pearl et al. | 210/450 |
| 5,149,431 | 9/1992 | Coen | 210/441 |
| 5,264,119 | 11/1993 | Rollins et al. | 210/450 |
| 5,376,271 | 12/1994 | Morgan, Jr. | 210/453 |
| 5,399,264 | 3/1995 | Pulek et al. | 210/450 |

*Primary Examiner*—W. L. Walker
*Attorney, Agent, or Firm*—Baker & Daniels

[57] ABSTRACT

A liquid filtering device includes a vessel and a filtering cartridge within the vessel. A pressure seal between the outlet venting of the cartridge includes a circumferentially extending skirt which is communicated with pressure at the inlet of the vessel, which is higher than the pressure of the outlet of the vessel by the pressure drop across the filtering cartridge. Accordingly, the skirt is maintained in sealing engagement with a portion of the vessel or the support plate area by the vessel, thereby preventing bypass of fluid directly from the inlet to the outlet.

10 Claims, 4 Drawing Sheets

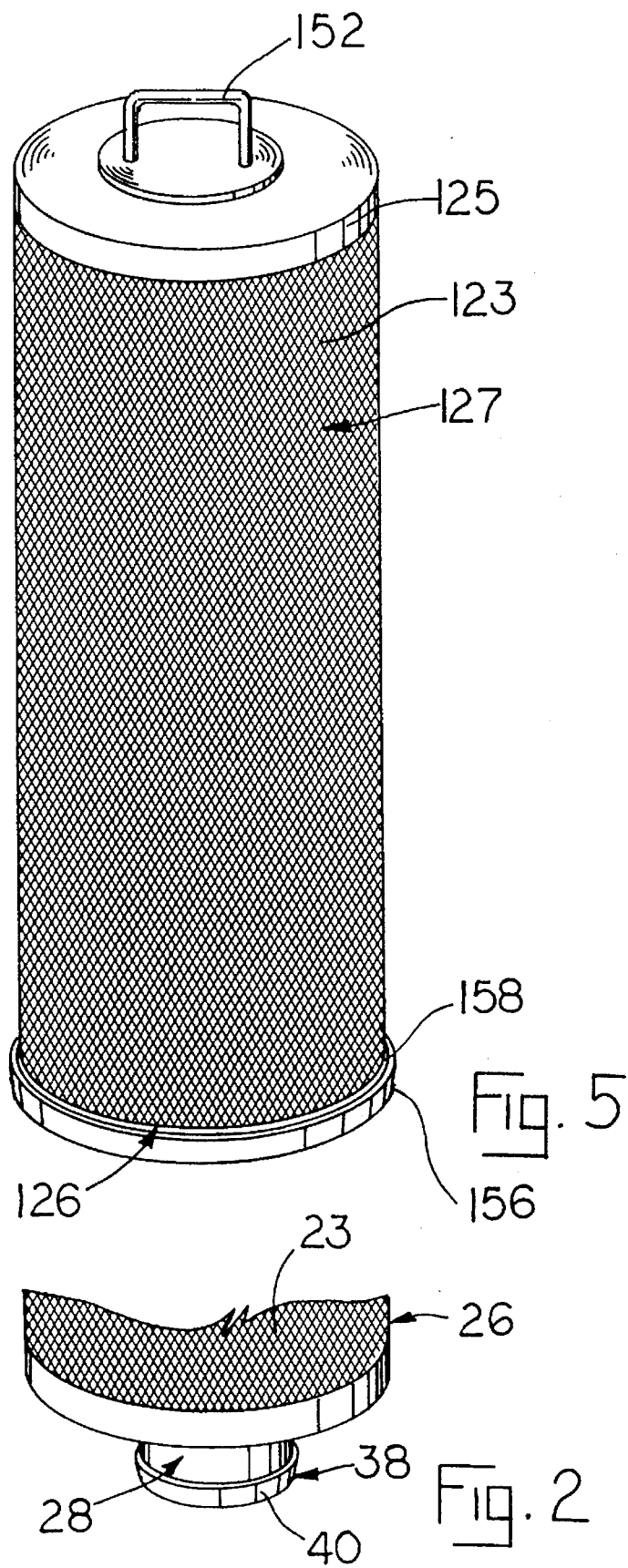

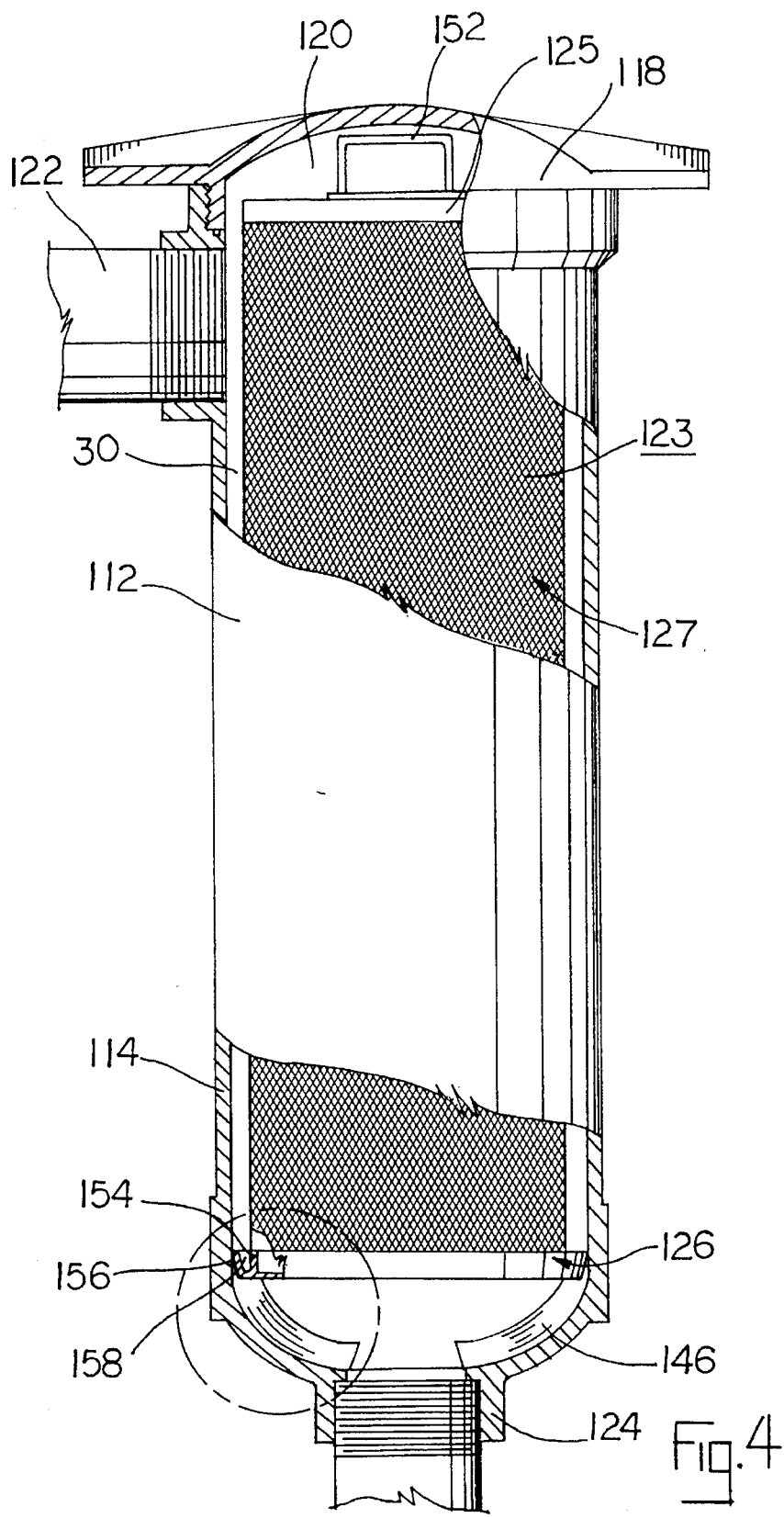

LIQUID FILTERING DEVICE INCLUDING A VESSEL AND CARTRIDGE HAVING COOPERATING SUPPORT This invention relates to a filtering device for filtering liquids.

Large filtering vessels are commonly used for filtering industrial chemicals, such as solvents, cleaning fluids, etc. Such filtering devices are of two different types. One type, such as that disclosed in U.S. Pat. No. 5,376,271, uses a filtering bag that is suspended within a liner within the filtering vessel. The fluid to be filtered is communicated into the bag, and then communicates through the wall of the bag and the liner to the fluid outlet. Another type of filtering device uses a filtering cartridge mounted within the vessel. The filter cartridge defines an outer circumferential surface which cooperates with the wall of the filtering vessel to define an inlet chamber. The filter cartridge further includes a centertube extending coaxially within the cartridge. Liquid to be filtered communicates from the inlet chamber through filtering media found between the outer circumference of the filtering cartridge and the center tube, and then communicates through the centertube to the outlet of the vessel. In either case, the bag or filter cartridge must be changed periodically, as the contaminants removed from the liquid being filtered are captured within the bag or within the filtering media of the filter cartridge. Accordingly, it is necessary for the filter cartridge to be easily removable and for a new filtering cartridge to be easily installable in the filtering vessel. It is also necessary to maintain a fluid tight seal between the inlet chamber and the outlet from the filtering vessel, so that all of the liquid communicated into the inlet chamber must communicate through the filtering media; it is undesirable that any liquid with entrained contaminants bypasses the filter cartridge and pass directly to the outlet.

The present invention provides a filtering vessel with a cartridge support member installed in the lower end thereof. The cartridge, in one embodiment, is provided with an outlet fitting that plugs into an aperture defined within the support member. A seal is carried by the outlet fitting that includes a circumferentially extending skirt that forms a cup shaped recess which receives pressure from the inlet chamber, which forces the skirt into sealing engagement with the aperture, thereby assuring that fluid cannot pass directly from the inlet to the outlet bypassing the filter cartridge. According to another embodiment of the invention, a seal is provided on the lower end surface of the cartridge that directly engages the wall of the vessel.

These and other advantages of the invention will become apparent from the following description, with reference to the accompanying drawings, in which:

FIG. 2 is a fragmentary view in perspective of the lowermost portion of the filtering cartridge used in the filtering device illustrated in FIG. 1;

FIG. 4 is a view similar to FIG. 1 but illustrating an alternate embodiment of the present invention;

FIG. 5 is a view in perspective of the filtering cartridge used in the embodiment of FIG. 4.

Figure 1:
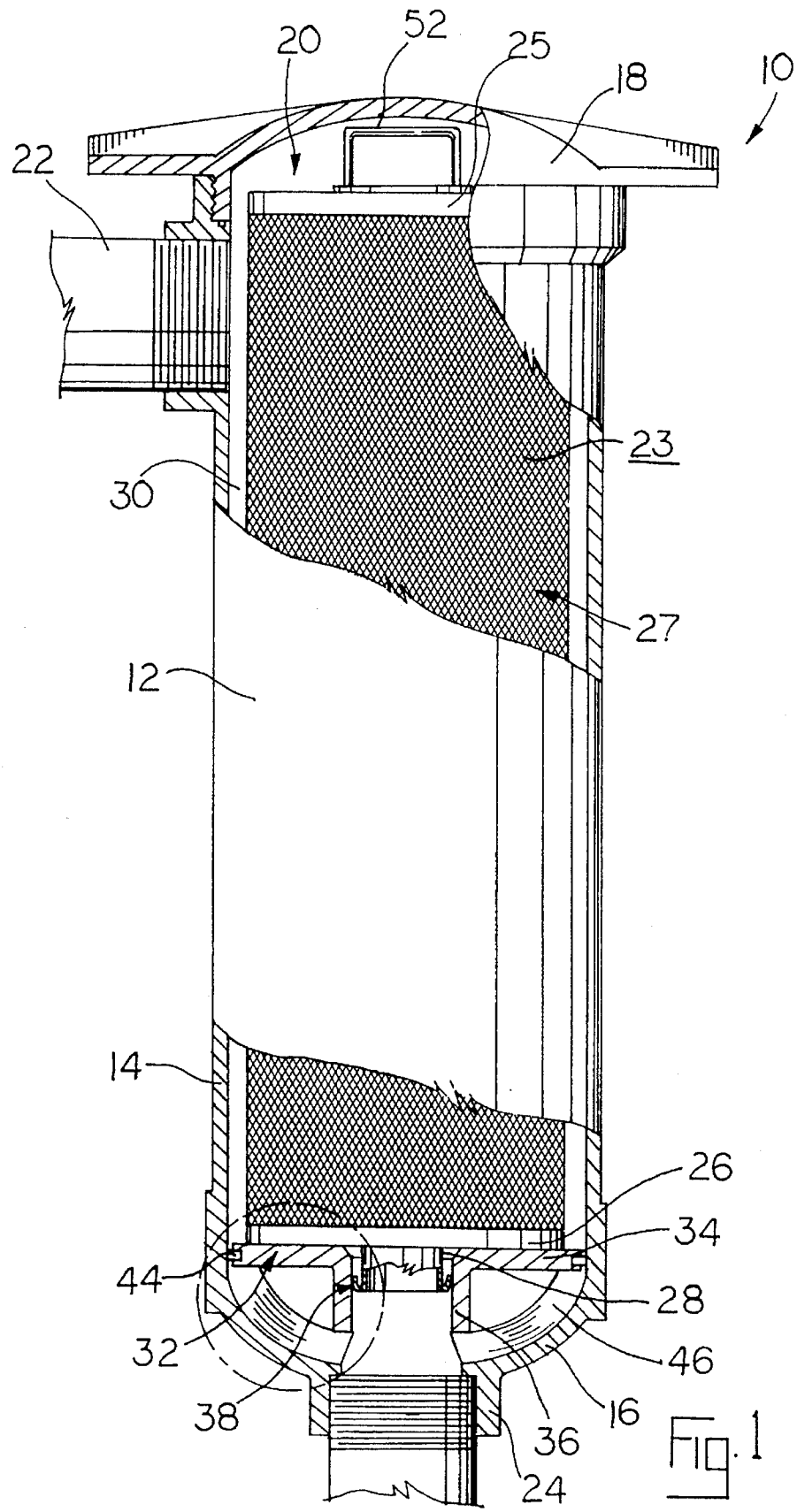
FIG. 1 is a side elevational view, partly in cross-section, of a filtering device made pursuant to the teachings of the present invention.
Figure 3:
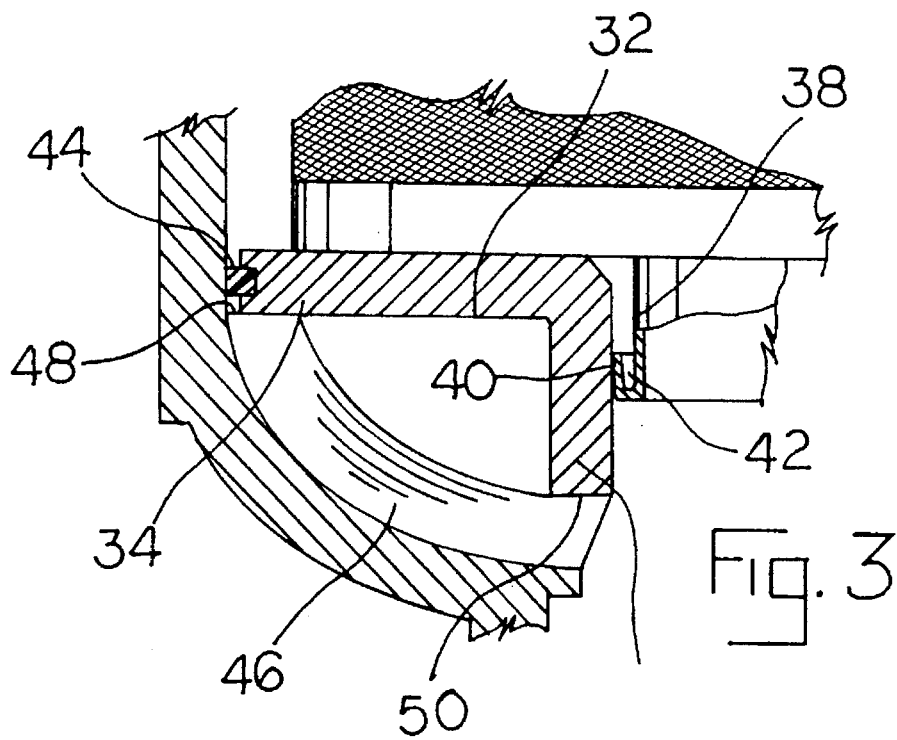
FIG. 3 is an enlarged fragmentary view of the circumscribed portion of FIG. 1.

Referring now to FIGS. 1–3 of the drawings, a filtering device generally indicated by the numeral 10 includes a filter vessel 12 having a circumferentially extending outer wall 14, a bottom wall 16, and a removable closure member 18 constituting an upper wall of the vessel 12. The walls 14, 16 and 18 cooperate to define a pressure chamber generally indicated by the numeral 20. The vessel 12 further includes a fluid inlet 22 which extends through circumferentially extending wall 14 and a fluid outlet 24 which extends through the wall 16.

A filtering cartridge generally indicated by the numeral 27 is installed in the pressure chamber 20 and includes a circumferentially extending filtering surface 23 and upper and lower end surfaces 25, 26. A centertube (not shown) extends coaxially within the cartridge 26 and terminates in an outlet fitting 28. Filtering media, the outer circumferential surface of which constitutes the filtering surface 23, is located between the surface 23 and the centertube. Since the filtering media is conventional, it will not be described in detail herein. The filtering surface 23 cooperates with the enclosure 18 and the circumferentially extending wall 14 to define an inlet chamber 30 therebetween, which is communicated to inlet 22. A support plate generally indicated by the numeral 32 includes a transverse portion 34 which engages end surface 26 of the cartridge 22 to support the latter within the vessel. Support plate 32 further includes axially extending portion 36 which defines an aperture receiving the outlet fitting 28 of the cartridge 22. A pressure seal generally indicated by the numeral 38 is carried by the fitting 28 and sealingly engages the aperture defined by the axially extending portion 36 of plate 34. The seal 38 includes a circumferentially extending skirt 40 which projects radially from the end of the fitting 28 and then extends axially relative to the fitting 28 to define a circumferentially extending cavity 42 between the skirt 40 and the fitting 28. A circumferentially extending seal 44 circumscribes the transverse portion 34 of support plate 32 to effect sealing between the support plate 32 and the circumferentially extending wall 14 of the vessel 12.

The support plate 32 is supported within the pressure chamber 20 by circumferentially spaced fins 46. The fins 46 are integral with the bottom wall 16 and include a transversely extending surface 48 which supports the transverse portion 34 of the support plate 32 and a support surface 50 which supports the axially extending portion 36 of the support plate 32. The support plate 32 rests upon the fins of 46 and may be removed from the housing if necessary.

In operation, the cartridge 27 is installed within pressure chamber 20 by first removing the closure 28, and then forcing the outlet fitting 28 into the aperture defined by the axially extending section 36 of support plate 32 until the end surface 26 of the cartridge 23 rests upon the transversely extending portion 34. The end closure 18 is then reinstalled, to thereby permit pressurization of the pressure chamber 20 by liquid communicated through inlet 22. The cartridge 23 is supported within the vessel 12 by the connection between the outlet fitting 28 and the axially extending portion 36 of support plate 32 and by the engagement of end surface 26 with the transversely extending portion 34. Since substantially the same pressure in inlet chamber 30 will act on all areas of the filtering surface 27, and on end surface 25, no additional support is necessary. Although the end surface 26 rests upon the transverse portion 34, a fluid seal is not effected so that the pressure in inlet chamber 30 is free to communicate in the interface between the end surface 26 and the transverse portion 34, so that inlet pressure is communicated into cavity 42 of the seal 38. Accordingly, since the pressure of the inlet is greater than the pressure at the outlet 24 due to the pressure drop across the cartridge 23, the skirt 40 will be maintained in sealing engagement with the aperture defined by axially extending portion 36, thereby preventing communication of fluid from the inlet directly to the outlet 24. When the cartridge 27 requires replacement, the closure 18 is removed, the handle 52 is grasped, and the cartridge is pulled out of the vessel 12 and a new one installed.

Figure 6:
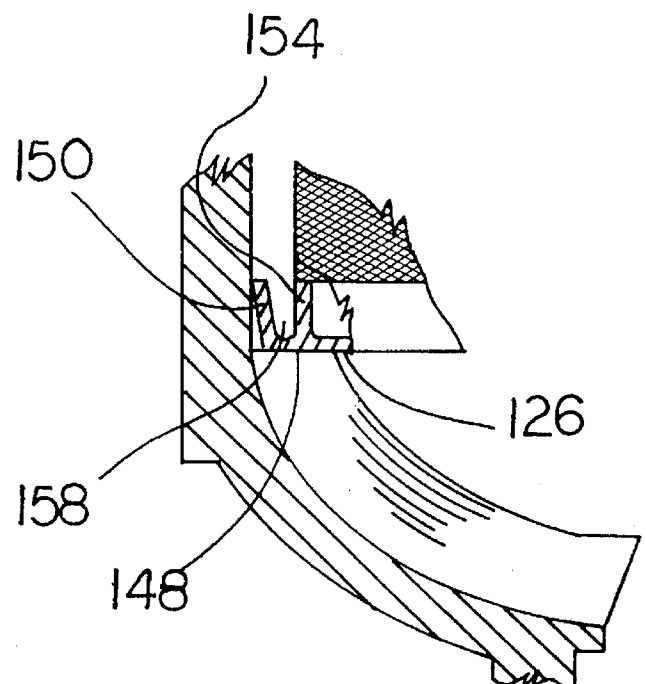
FIG. 6 is an enlarged fragmentary view of the circumscribed portion of FIG. 4.

In the alternate embodiment of FIGS. 4–6, numbers the same or substantially the same as those in the preferred embodiment retain the same reference character but are increased by 100. In the embodiment of FIGS. 4–6, the support plate 32 is omitted and the end surface 26 includes an axially extending portion 154 which cooperates with a skirt 156 which extends radially from portion 154 and then axially alongside portion 154 to define a cavity 158 therebetween. The skirt 156 engages the wall 114 of the vessel 112 and is subjected to pressure in inlet chamber 130 which communicates into the circumferentially extending cavity 158 to force the skirt 156 into sealing engagement with circumferentially extending wall 114. The end surface 126 rests directly upon the surface 148 of the fins 46 to thereby support the cartridge within the vessel. The cartridge 127 can therefore be removed and replaced in exactly the same manner as the cartridge of the embodiment of FIGS. 1–3.

I claim:

1. Liquid filtering device comprising a vessel having a circumferentially extending wall and a pair of end walls defining a chamber therewithin, said vessel having an inlet and an outlet, a filter cartridge within said chamber, said cartridge having a circumferentially extending filtering surface communicated with said inlet of the vessel and a pair of opposite end surfaces, said cartridge having an outlet fitting communicated to the outlet of the vessel, said vessel and said cartridge including cooperating support means within said chamber engaging one of said end surfaces for supporting said cartridge within the vessel but permitting said cartridge to be removed from the vessel by pulling said cartridge away from said support means, a pressure seal carried by the cartridge for sealing with the vessel, said pressure seal having a circumferentially extending pressure responsive skirt carried by the cartridge for sealing with the vessel, said pressure seal being responsive to pressure at said inlet to seal against said vessel but releasing when the pressure at the inlet is reduced, said skirt slidably engaging said vessel and sliding relative to said vessel when the cartridge is pulled away from the support means.

2. Liquid filtering device as claimed in claim 1, wherein said support means includes a transversely extending support plate extending across said chamber and engaging one of said end surfaces of the cartridge to support the latter within the chamber.

3. Liquid filtering device as claimed in claim 2, wherein said support plate includes an aperture slidably receiving said outlet fitting, said retaining means including a seal between the outlet fitting and the aperture.

4. Liquid filtering device as claimed in claim 3, wherein said seal includes a pressure responsive portion engaging said aperture to effect a seal between the outlet fitting and the aperture, said pressure responsive portion being responsive to pressure at said inlet to seal against said aperture but releasing when the pressure at the inlet is reduced.

5. Liquid filtering device as claimed in claim 4, wherein said seal includes a circumferentially extending skirt extending from said outlet fitting, said skirt cooperating with the outlet fitting to define a pressure volume communicated with pressure at the inlet, whereby fluid pressure in said volume forces the skirt into sealing engagement with said aperture when pressure is communicated into the vessel while permitting said cartridge to be pulled out of the support plate when the vessel is depressurized.

6. Liquid filtering device as claimed in claim 3, wherein said support means includes circumferentially spaced fins extending radially with respect to said chamber, each of said fins including cooperating support surfaces for supporting said support plate.

7. Liquid filtering device comprising a vessel having a circumferentially extending wall and a pair of end walls defining a chamber therewithin, said vessel having an inlet and an outlet, a filter cartridge within said chamber, said cartridge having a circumferentially extending filtering surface communicated with said inlet of the vessel and a pair of opposite end surfaces, said cartridge having an outlet fitting communicated to the outlet of the vessel, said vessel and said cartridge including cooperating support means within said chamber engaging one of said end surfaces for supporting said cartridge within the vessel but permitting said cartridge to be removed from the vessel by pulling said cartridge away from said support means, a pressure seal carried by the cartridge for sealing with the vessel, said pressure seal being responsive to pressure at said inlet to seal against said vessel but releasing when the pressure at the inlet is reduced, said support means includes circumferentially spaced fins extending radially with respect to said chamber, each of said fins including cooperating support surfaces for engagement with one of the end surfaces of the cartridge for supporting the latter within said chamber.

8. Liquid filtering device as claimed in claim 7, wherein a seal is carried on said one end portion carries a circumferentially extending seal for sealing with the circumferentially extending wall, said seal being responsive to pressure at said inlet to seal against said vessel but releasing when the pressure at the inlet is reduced.

9. Liquid filtering device as claimed in claim 8, wherein said seal includes a circumferentially extending skirt extending from said cartridge, said skirt cooperating with the cartridge to define a pressure volume communicated with pressure at the inlet, whereby fluid pressure in said volume forces the skirt into sealing engagement with said circumferentially extending wall when pressure is communicated into the vessel while permitting said cartridge to be pulled out of the vessel when the latter is depressurized.

10. Liquid filtering device comprising a vessel having a circumferentially extending wall and a pair of end walls defining a chamber therewithin, said vessel having an inlet and an outlet, a filter cartridge within said chamber, said cartridge having a circumferentially extending filtering surface communicated with said inlet of the vessel and a pair of opposite end surfaces, said cartridge having an outlet fitting communicated to the outlet of the vessel, said vessel and said cartridge including cooperating support means within said chamber engaging one of said end surfaces for supporting said cartridge within the vessel but permitting said cartridge to be removed from the vessel by pulling said cartridge away from said support means, a pressure seal carried by the cartridge for sealing with the vessel, said pressure seal being responsive to pressure at said inlet to seal against said vessel but releasing when the pressure at the inlet is reduced, said seal including a circumferentially extending skirt extending from said cartridge and slidably engaging said vessel, said skirt cooperating with the cartridge to define a pressure volume communicated with pressure at the inlet, whereby fluid pressure in said volume forces the skirt into sealing engagement with said vessel when pressure is communicated into the vessel while permitting said cartridge to be pulled out of the vessel when the latter is depressurized.

* * * * *